United States Patent
Moore

(10) Patent No.: US 8,082,166 B2
(45) Date of Patent: Dec. 20, 2011

(54) METHOD TO FACILITATE OBTAINING, STORING, AND SUBSEQUENTLY CONVEYING AN ORGANIZATION'S INFORMATION FOR THE BENEFIT OF SUCCESSOR ORGANIZATION-BASED AGENTS

(75) Inventor: Barrett H. Moore, Winnetka, IL (US)

(73) Assignee: Mary S. Moore, Winnetka, IL (US)

( * ) Notice: Subject to any disclaimer, the term of this patent is extended or adjusted under 35 U.S.C. 154(b) by 1359 days.

(21) Appl. No.: 11/554,412

(22) Filed: Oct. 30, 2006

(65) Prior Publication Data

US 2008/0103844 A1    May 1, 2008

(51) Int. Cl.
G06F 17/30    (2006.01)
(52) U.S. Cl. .................................................. 705/7.11
(58) Field of Classification Search .............. 705/7–8, 705/7.11
See application file for complete search history.

(56) References Cited

U.S. PATENT DOCUMENTS

2002/0082894 A1* 6/2002 Azuma ............................ 705/8
2006/0235715 A1* 10/2006 Abrams et al. .................... 705/1

OTHER PUBLICATIONS

Chen et al "A novel key management scheme for dynamic access control in a user hierarchy", Dec. 2004, Applied MAthematics and Computations, pp. 339-351.*

* cited by examiner

Primary Examiner — Romain Jeanty
(74) Attorney, Agent, or Firm — Fitch Even Tabin & Flannery

(57) ABSTRACT

A party obtains (101) information from a plurality of different organizations and identifies (102) information recipient criteria as a function, at least in part, of at least one specific organization-based hierarchical function. This information and the information recipient criteria is then stored (108) non-volatily under conditions designed to preserve the information integrity of the information and the information recipient criteria for multiple successive successor organization-based agent generations. This can further comprise maintaining (110) at least this information in confidence while storing the information. As appropriate over time, the information as corresponds to a given one of the different organizations is provided (111) to respective successor organization-based agents who meet the corresponding information recipient criteria. So configured, successive generations of the successor organization-based agents within each of the different organizations will have sequential access to the information as corresponds to their respective organization while the information remains unrevealed to others.

83 Claims, 1 Drawing Sheet

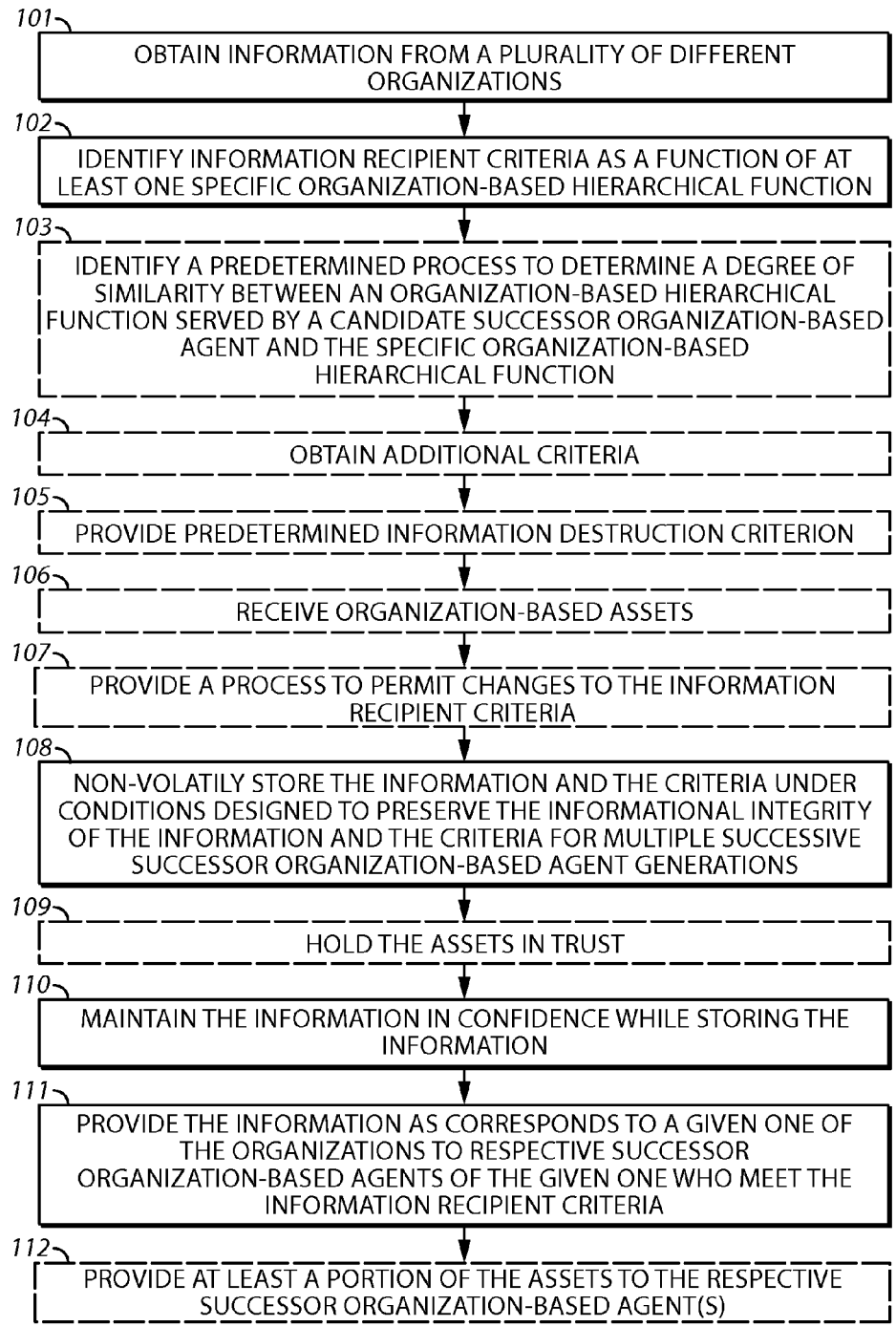

METHOD TO FACILITATE OBTAINING, STORING, AND SUBSEQUENTLY CONVEYING AN ORGANIZATION'S INFORMATION FOR THE BENEFIT OF SUCCESSOR ORGANIZATION-BASED AGENTS

TECHNICAL FIELD

This invention relates generally to storing and conveying information.

BACKGROUND

Organizations of various kinds are known in the art. Examples include business organizations of various kinds (including privately held and publicly traded corporations, partnerships of various kinds, and so forth), charitable and philanthropic organizations (including both profit-based and not-for-profit entities), ecclesiastical organizations, fraternal and other membership-based organizations, and so forth. Such entities are typically recognized at law as having an independent legal standing. Accordingly, such organizations continue to exist even as the persons who comprise the agents of such entities come and go over time (as a result, for example, of death, illness, retirement, and so forth).

Most organizations have at least some information that comprises confidential information. The nature and extent of such information can and will vary widely with respect to the nature of the organization itself as well as the relative sophistication or naivete of the organization with respect to identifying and maintaining information of this kind.

Existing behaviors in these regards, however, leaves much to be desired. In many cases, a given individual within such an organization will find that their greatest asset comprises information. Information regarding what to do, and what not to do, in various situations, for example. Information that reflects, in some cases, a career's worth of experience, experiment, and observation. For the most part, existing practices handle such information rather clumsily if at all. In many cases, at best, an existing agent of a given organization serves as a tutor for their replacement and passes along whatever they think might be useful. The flaws of this approach are many and considerable.

Further, the personal handing down of wisdom, experience, and advice from one generation of agents to the next is only as reliable as the weakest successor link. A poor or uninspiring deliverer of such information and/or an uncaring, uninterested recipient can contribute to a complete loss or distortion of such information. There are also individuals (and even entire organizations) who harbor a concern that their personal story will be subject to intentional or unintentional revisionist alterations at a time when they will be unable to correct misunderstandings. Again, the accuracy of a given narrative is more likely to change with retellings from one generation to another than not.

By one approach, a given agent or organization can commit such information to a book, an Internet resource, or other public mechanism to ensure that such information is not lost in such ways. This, however, requires releasing such information to a public forum. At worst, persons outside one's organization may use such information while those within the organization ignore it, all to the possible eventual harm of the organization in a competitive world.

A genuine problem exists, therefore, with respect to providing an organization's wisdom, experience, and advice to future generations in a manner that tends to preserve both the sanctity of that information and its confidentiality or limited dissemination. Present solutions offer a look-and-feel of value in this regard, but are in fact greatly lacking in substantive effect.

BRIEF DESCRIPTION OF THE DRAWING

The above needs are at least partially met through provision of the method to facilitate obtaining, storing, and subsequently conveying an organization's information for the benefit of successor organization-based agents described in the following detailed description, particularly when studied in conjunction with the drawing, wherein the drawing comprises a flow diagram as configured in accordance with various embodiments of the invention.

Skilled artisans will appreciate that elements in the FIGURE are illustrated for simplicity and clarity. For example, common but well-understood elements that are useful or necessary in a commercially feasible embodiment may not be described in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a party (such as a private entity) obtains information from a plurality of different organizations. One then identifies, for the information of each of these different organizations, information recipient criteria as a function, at least in part, of at least one specific organization-based hierarchical function. This information and the information recipient criteria is then stored non-volatily under conditions designed to preserve the information integrity of the information and the information recipient criteria for multiple successive successor organization-based agent generations. This can further comprise maintaining at least this information in confidence while storing the information. As appropriate over time, the information as corresponds to a given one of the different organizations is provided to respective successor organization-based agents who meet the corresponding information recipient criteria. So configured, successive generations of the successor organization-based agents within each of the different organizations will have sequential access to the information as corresponds to their respective organization while the information remains unrevealed to others.

Those skilled in the art will recognize and appreciate that these teachings achieve numerous goals and desires of various organizations and persons within such organizations while simultaneously avoiding or minimizing many of the problems that have plagued prior art solutions in this space. While these teachings are able to accommodate the handling of things (such as assets of various kinds), these teachings are primarily directed at the handling of information in a manner that tightly coincides with a given organization's present intent and wishes. By these teachings a given organization (or individual within such an organization) can gain a concrete assurance that their wisdom, advice, knowledge, and/or experience will be rendered tangibly available to future agents in service to that organization while remaining substantially unavailable to non-organization members in the absence of some express authorization, action, or the like.

These and other benefits may become clearer upon making a thorough review and study of the following detailed description. Referring now to the drawing, an illustrative process as accords with these teachings and as may be practiced by a corresponding private entity will be described. (This private entity may comprise either a for-profit enterprise or a not-for-profit enterprise and those skilled in the art will understand and recognize that as used herein, "private" refers to either a privately held or a publicly held and traded enterprise.)

Pursuant to this process 100, the private entity facilitates the obtainment 101 of information from each of a plurality of different organizations; i.e., organizations who are not specifically related to one another with respect to ownership or control. To put it more bluntly, the private entity holds this process 100 open to the general public of organizations (though possibly with eligibility requirements pertaining to criteria of interest such as place of incorporation, capitalization, age, or the like).

By one approach this can comprise receiving such information from a single agent for each of the different organizations. (As used herein, the term agent will be understood to refer to full time and part time employees, contractors, directors, and such others who owe a fiduciary duty to the organization.) This can comprise, for example, receiving the information from a particular individual such as a chief executive officer. By another approach this can comprise receiving such information from a plurality of individuals that are agents for a given one of the different organizations. This can comprise, for example, receiving the information from the board of directors of a given organization.

Such information can comprise a wide range of content including, but not limited to, instructions, wishes, lessons, observations, meeting notes or transcripts, reports, studies, presentations, plans (including both short term and strategic planning materials), organization charts, conclusions, organization history, personal notes, a diary or daily journal or the like, directions to secreted organization information, valuables, or the like, pictures (including photographs, paintings, sculptures, and other renderings in physical or virtual form), video and audio recordings, and so forth. By one approach, this information can be completely determined, in both substance and form, by the organization providing the information. In such a case, this step of obtaining such information can simply comprise receiving whatever information the corresponding organization might choose to provide.

The information obtained can comprise textually-based content (in whatever form including Braille format), audio-only content, audio-visual content, visual-only content, and/or even olfactory-based content as desired by use of appropriate corresponding recording equipment and/or chemical analysis equipment and techniques. The specific media or vehicle used may vary, for example, with the needs, preferences, requirements, and/or opportunities as pertain to a given one of the organizations. It would also be possible to obtain substantively identical content using multiple such approaches. For example, the information might be obtained in both a recorded audio format and a textual format.

These teachings will accommodate obtaining such information using any of a variety of information gathering techniques as are presently known in the art or as may be developed in the future. By one approach, this can simply comprise receiving the information from such an organization in whatever form (and with whatever content) it might wish to employ. This could include information from one or more agents of the organization that has simply been volunteered; i.e., information that such agents might believe is particularly important with respect to their job, the organization itself, or some other point of context and relevancy. If desired, such an organization could identify or more agents who might hold pivotal knowledge (i.e., knowledge regarding the specific manner and ways by which certain processes are successfully and optimally carried out, specific product formulas, and so forth) who could be specifically invited (or required) to make information contributions in this regard.

Also if desired it would be possible to obtain information for at least one such organization by obtaining information from a third party on behalf of that organization. This may be useful or appropriate, for example, when a particular supplier, vendor, customer, or consultant of the organization has information that is deemed appropriate for collection and submission in this regard. This could also encompass, for example, obtaining information from another organization such as a partner organization or even a competitor organization where, again, the circumstances so suggest or dictate.

Such information can be obtained, for example, via an interview process of one or more representatives of the organization or other indicated parties of interest. Such an interview can be conducted, in whole or in part, by one or more live interviewers. It would also be possible if desired to use a virtual interviewer (such as, but not limited to, an interactive software-based interviewer that may employ, if desired, artificial intelligence to guide, shape, and inform the interview process). Interviewing techniques in general, including those facilitated through the use of artificial intelligence platforms, are generally known in the art and these teachings are not overly sensitive to the selection of any particular approach in this regard. It is also possible that such an interview can comprise a minimalist approach, as when the sum total of the inquiry provided to the information provider is, directly or impliedly, the substantive equivalent of "What information would you like to provide?"

By another approach, the organization can be provided with one or more guides or instructions to facilitate the gathering and presentation of such information. This might comprise, for example, providing the organization with a questionnaire that is designed to elicit information of value or interest. A single generic questionnaire might be used for this purpose or a variety of more specific questionnaires could be developed and used. For example, one questionnaire could be designed expressly to elicit an organization history from the interviewee(s) while another questionnaire could contain questions more expressly designed to extract useful information regarding the basis for key acquisition decisions, expansion decisions that involved increasing the organization's workforce by more than five percent, and so forth. It would also be possible to pose hypothetical questions to the interviewee(s). The answers to such questions might then serve to define, articulate, and/or illustrate and exemplify such things as the values, ethics, morals, goals, or viewpoints of the individual and/or organization in question.

Such a questionnaire can assume any of a variety of forms. This can include, for example, a written questionnaire provided in hardcopy (as a book, pamphlet, or the like) or in a virtual form (such as an on-line-based document or the like). It would also be possible to administer such a questionnaire through one or more interrogators. Such interrogators could give voice to the questions and possibly also serve, if desired, to interpret, explain, or amplify upon the question posed as appropriate.

It would also be possible to obtain such information using a diary-style information entry look-and-feel form factor.

This may comprise either a hardcopy approach (using a hardcopy diary, log, journal, or the like) or a soft or virtual approach as when the entries are obtained via, for example, a virtual diary, an on-line data entry service, or even via an email-styled approach. As to the latter, it would be possible, for example, to permit an organization's agents to send emails, when and as they saw fit, to an email address that correlated to a person or platform that served to collect such offerings as the obtained information mentioned above.

Whether through the use of a questionnaire approach, a diary-style approach, or some other approach, this step of obtaining information can also comprise, if desired, substantively organizing the information for at least one of the organizations. This can comprise, for example, organizing the information by topic areas. To illustrate, the submissions by a given organization might be parsed into corresponding substantive categories such as history, business practices, charitable practices, hiring goals, and training (presuming for the sake of example that these are the primary categories to which this organization's information are found to relate).

It would also be possible for such information obtainment to further comprise editing the information with respect to matters of form. This could relate, for example, to spelling correction, grammar correction, and so forth. This could also include translating the information from an original language into one or more other languages of choice (as may be useful when the organization believes, hopes, or expects that one or more of their business successors will likely speak such other language).

Such information can be so obtained via a single corresponding information-gathering event if desired. By one approach, this single information-gathering event can comprise a single interview opportunity or can, if desired, comprise a plurality of temporally discrete sub-events (as when the gathering of the information takes place, say, over an initial two week period or the like). By another approach, however, such information can be obtained with less restriction in this regard. For example, these teachings will accommodate obtaining such information from a given organization on a more or less random or unscheduled basis over an indefinite period of time if so desired.

As alluded to above, and as will be explained below in more detail, the aforementioned information has been obtained in order to eventually facilitate its distribution to one or more successor organization-based agents of a given organization. With that in mind, this process 100 will therefore provide for identifying 102, for the information of each of the plurality of different organizations, information recipient criteria.

By one approach, such information recipient criteria is identified as a function, at least in part, of at least one specific organization-based hierarchical function. To illustrate, the identified organization-based hierarchical function can comprise a specific office that has one or more functions traditionally associated therewith. Examples in this regard could include, but are not limited to, chief executive officer, chief financial officer, chief technology officer, director of human relations, director of research, and so forth. By one approach, for example, this can comprise identifying an organization-based hierarchical function that corresponds to an organization-based hierarchical function as is served by one of the individuals who has provided at least some of the previously mentioned information.

By another approach, such information recipient criteria can be identified as a function, at least in part, of at least one specific organization-based responsibility. Examples in this regard could include, but again are not limited to, a primary accounting responsibility, a primary outsourcing responsibility, a primary facilities maintenance responsibility, and so forth.

If desired, this information recipient criteria can further comprise related criteria to be applied when determining whether to deny providing information to a particular candidate successor organization-based agent. Examples in this regard might include, but are not limited to:

an amount of time that the candidate successor organization-based agent has served in a particular role on behalf of a corresponding one of the different organizations;

an amount of time that the candidate successor organization-based agent has served at at least a particular hierarchical level within a corresponding one of the different organizations;

a change of ownership with respect to a corresponding one of the different organizations;

a change of control with respect to a corresponding one of the different organizations;

a change with respect to a particular product offering of a corresponding one of the different organizations;

a change with respect to a particular service offering of a corresponding one of the different organizations; and/or a change with respect to market share performance of a corresponding one of the different organizations.

In general, those skilled in the art will recognize and appreciate that such information recipient criteria does not simply comprise a general reference to the organization itself. Instead, this information recipient criteria is intended to facilitate identifying particular individuals who would potentially benefit from being provided with the stored information as a function of their respective position and responsibilities within the organization.

As noted, such information recipient criteria will later serve to facilitate determining when, and to whom, the previously provided information will be provided. As these teachings are intended to address long periods of time including a potentially indefinite period of time, it is possible that the application and use of this information recipient criteria will become less obvious over time. For example, organizational functions may change over time. This, in turn, can potentially lead to confusion with respect to applying these information recipient criteria at a future time.

Accordingly, if desired, this process 100 will optionally accommodate identifying 103 a predetermined process to address and resolve such issues when and as they arise. This can comprise, for example, a process to determine a degree of similarity between an organization-based hierarchical function as is served by a given candidate successor organization-based agent and the aforementioned specific organization-based hierarchical function to thereby facilitate determining whether to provide the information of a given organization to this particular candidate successor organization-based agent. Such a process can be wholly rule-based if desired or can, for example, comprise a process to facilitate selecting one or more parties who are to be charged with determining such a degree of similarity.

This process 100 will also optionally accommodate, if desired, also obtaining 104 additional criterion to be additionally met by a given successor organization-based agent before providing information to such a person for a given one of the different organizations. For example, a given organization may wish to condition the distribution of some or all of their proffered information upon such things as:

an age of the given one of the successor organization-based agents;

an educational attainment of the given one of the successor organization-based agents;

an academic achievement of the given one of the successor organization-based agents;

an organization-based achievement of the given one of the successor organization-based agents;

matrimonial status of the given one of the successor organization-based agents;

health of the given one of the successor organization-based agents;

illegal behavior by the given one of the successor organization-based agents;

substance abuse by the given one of the organization-based successors;

a lie detector test of the given one of the organization-based successors;

an addiction of the given one of the successor organization-based agents;

gender of the given one of the successor organization-based agents;

a demonstrative level of maturity of the given one of the successor organization-based agents;

net worth of the given one of the successor organization-based agents;

an occurrence of a particular specified event.

to note but a few examples in this regard (where those skilled in the art will recognize and understand that these examples are intended to serve an illustrative purpose only and are not intended to comprise an exhaustive listing of all possibilities in this regard). These criteria can be as general, or as specific, as a given organization may wish to provide.

As noted above, in certain cases the information being so obtained with respect to a given organization may itself be sourced by a third party organization (which may, or may not, itself be a beneficiary information recipient of the described process 100). In such a case, this additional criteria could comprise, for example, a requirement that such externally sourced information only be provided to a qualified recipient within the given organization when a particular future condition regarding the third party organization holds true. To illustrate, the additional criteria could pertain to requirements regarding the existence (or non-existence), solvency, and/or level of capitalization or market share of the third party organization. As another illustration, the additional criteria could pertain to requirements regarding the existence of a viable supplier-vender relationship between the third party organization and the given organization.

It is possible, of course, that a given organization might wish to provide for the destruction of some or all of their information in the event of certain future occurrences. To facilitate such action, this process 100 can optionally provide for further providing 105 a predetermined information destruction criterion (or criteria) as corresponds to at least one of the different organizations. Such criteria might comprise, for example, a declaration or finding of insolvency of the organization, nationalization of the organization's assets, a specific future date, and so forth. So configured, upon detecting that the predetermined information destruction criterion (or criteria) has been met, the corresponding information can be destroyed.

The foregoing steps relate to information. If desired, however, this process 100 will also accommodate receiving 106 one or more assets from such an organization. Such assets can comprise things of great intrinsic value, things of sentimental value, things of education or exemplary value, things of historical value, and so forth. By one approach this asset can comprise the wherewithal to permit a given information recipient to take a particular action urged by the organization in its information.

If desired, this process 100 can also provide 107 a process to permit changes to the aforementioned information recipient criteria as corresponds to at least a given one of the different organizations. This might comprise, for example, providing a process to permit such changes to be effected by a particular one of the successor organization-based agents who otherwise met the information recipient criteria for their corresponding organization. This would permit, for example, a future information recipient to change the criteria by which a subsequent future candidate information recipient would be judged in this regard. Such a process can provide for various constraints as desired. For example, such changes could be prohibited until after a particular date had been reached, until a certain number of successive information recipients had each agreed to a particular change, or the like.

This process 100 then provides for non-volatily storing 108 the information and the information recipient criteria under conditions designed to preserve the informational integrity of the information and the information recipient criteria for multiple generations of successive successor organization-based agents of these different organizations. Those skilled in the art will recognize that the expression "non-volatily" refers to a storage context that is not unduly tenuous; i.e., a memory that will not lose its contents when exposed to a relatively ordinary and expected operating event (such as a temporary loss of power) is often characterized as comprising non-volatile memory. The precise nature of such storage can vary and will almost certainly vary over time as technologies change.

At present, this might comprise storing hardcopy versions of the information and the information recipient criteria in a location that is secure with respect to various threats such as fire, water, unauthorized access, insects, humidity, and so forth. This might also comprise, at present, the use of one or more electromagnetic data storage facilities or optical data storage facilities as are presently known in the art. Other forms of data retention could also be used as desired including applying scrivened content on a non-volatile medium. For example, one could employ lasers to inscribe the information and the information recipient criteria in textual form on stone, non-corroding metal surfaces, and so forth.

It is anticipated that such storage practices will typically include examining alternative storage opportunities from time to time and, upon determining that a storage practice is now available that is better than a presently used storage practice that is being used to non-volatily store the information and the information recipient criteria, acquiring and using that storage practice for these purposes. The periodicity by which such an examination occurs can vary or can occur on a scheduled basis as desired. In general, however, with the overall passage of time it is expected that this will comprise repeatedly accessing then-presently available storage practices in this regard.

Regardless of the particular storage medium used, if desired, this step of storing the information and the information recipient criteria can further comprise using redundant storage facilities. By one approach, for example, this can comprise using storage facilities that share at least some of the same data and that are located substantially geographically distal to one another. This precise distance can vary with the needs and requirements of a given application setting. As one illustrative example in this regard, when seeking to position redundant assets in locations that will tend to assure survival of at least one of the storage assets upon the occurrence of a single massive civilly-catastrophic event, it may be prudent to place such assets many thousands of miles from one another. Another related approach would be to place redundant assets on differing continents or to place at least one such facility in orbit around the Earth, the Earth's moon, or elsewhere in space.

In some cases, it may also be desirable to place at least some of the data in a location that is at least substantially exempt from regulation by a single sovereignty. This might comprise, for example, storing such data in a ship or a substantially stationary platform (such as a submerged, floating, or above water platform such as the so-called micronation of Sealand) that remains in international waters. An airborne or even a space borne, off-Earth location may also serve in this regard.

Generally speaking, this step of storing the information and the information recipient criteria contemplates exactly that. If desired, however, and as noted above, this step can also encompass other data husbanding actions such as deleting particular items of information in response, for example, to a triggering event having occurred. As noted, a given organization can provide one or more information destruction criteria and, when a corresponding event occurs, this step can comprise modifying the information in some particular way (for example, by deleting the information in whole or in part). Various trigger criteria can serve in this regard. Some illustrative examples include, but are not limited to, a particular date, a particular specific event, and/or a particular kind of event.

As noted above, this process 100 will also optionally accommodate receiving 106 one or more assets from these organizations. Accordingly, just as this process 100 provides for storage 108 of received information this process 100 can also optionally provide for holding 109 such assets in trust. This can comprise using traditional available storage facilities (such as bank safe deposit boxes or the like) or can comprise using private storage facilities that are operated under the control and as per the dictates of the aforementioned private entity as desired. Again, and depending upon the fragility of the assets themselves, such storage can be designed to preserve and protect such assets against the depredations of time and damaging agents such as heat, humidity, moisture, theft, and so forth.

This process 100 also provides for maintaining 110 the information in confidence while storing that information. There are various means of facilitating such a step. This can certainly comprise providing security to prevent (or at least discourage) unauthorized individuals from gaining access to such information. This security can comprise barriers, guards, locks, surveillance, intrusion detectors, alarms, and so forth. This step can also comprise a careful vetting of all persons who are permitted access to such information for whatever reason. This can include the establishment of appropriate contracts regarding the applicable terms, conditions, and behaviors as shall attend such access as well as interviews, background checks, and so forth.

This step can also comprise, if desired, the use of encryption to encrypt the information. By one approach, the encryption key (or keys) can be stored separately from the encrypted information itself to afford an even greater level of security if desired. As one example in this regard, the encryption key can comprise, or can be based upon or be derived from, a particular organization's heirloom(s), trademark(s), or the like of choice.

At a minimum, this step of maintaining 110 such information in confidence can comprise preserving the information as pertains to one organization from disclosure or exposure to an information recipient for another one of the different organizations when providing that information recipient with their rightfully accessed information.

As alluded to earlier, this process 100 is intended to eventually serve as a way of facilitating dissemination of such information to corresponding vetted successor agents. Accordingly, this process 100 eventually serves to provide 111 the information as corresponds to various ones of the different organizations to their respective successor organization-based agents. To be clear on this point, the information as corresponds to a first such organization can be provided to the successor agents of that particular first organization but not to others of the different organizations and particularly not to the general public. Similarly, the information as corresponds to a second such organization can be provided to the qualifying successor agents of that particular second organization but not to others of the different organizations and particularly not to the general public.

By one approach, this provision of information occurs via a series of steps. This might include, for example, contacting the recipient, educating the recipient regarding the process, and providing the recipient with access to the information. By another approach, this provision of information might comprise an automatic provision of information. In such a case, the information could be automatically forwarded to the authorized recipient using a conveyance medium of choice or convenience.

These teachings will accommodate a variety of ways to accomplish such a step. By one approach, for example, the information can be provided to the corresponding successor agent in a substantially original form. By another approach, some or all of the information can be used to form a curriculum, which curriculum is then delivered to the corresponding successor agent(s). This might be done using a live academic setting if desired, where one or more live instructors present the material (perhaps over some series of classes). In a somewhat similar manner this information might be provided using a virtual academic setting. The organization that provides the information in the first instance may make decisions in this regard, at the time of initially providing the information as described above, based upon their institutional feelings regarding how best the information might be conveyed.

By one approach, some or all of such information is delivered via some review or instructional modality but the recipient is not permitted to take a copy of the information with them. In such a case, if desired, the recipient might be allowed to re-access the information on whatever schedule may be deemed appropriate in order to permit the recipient to effectively have subsequent access to the information. In the alternative, some or all of the conveyed information can be provided to the recipient in some usable physical form such that the recipient is able to re-access such information at their own convenience.

If desired, the provision of such information to an otherwise qualified and vetted information recipient can be further conditioned upon receiving the agreement of the information recipient to themselves retain the substance of the information in confidence and to not make further disclosure to other non-approved persons. In such a case, it may be useful to provide such information to a compliance enforcement person or entity to facilitate monitoring the information recipient for signs of inappropriate disclosures in this regard.

As noted earlier, these teachings will accommodate receiving 106 and holding one or more assets as provided by the different organizations. In such a case, this process 100 will also then accommodate providing 112 at least a portion of those assets to eligible successor agents. If desired, providing such assets can be based, at least in part, upon assessing the performance of a recipient of the information with respect, for example, to an instruction, challenge, or the like as may be contained, directly or indirectly, in that information. This can even comprise a series of events where a given successor agent performs a series of accomplishments as may be specifically or impliedly set forth in the information and receives, in turn, a series of corresponding allocations from the aforementioned assets.

As noted, this process 100 can serve to facilitate the availability of information from one generation of organization-based agents to another over any number of subsequent generations. By one approach, each subsequent generation can, if they wish, initiate such a process from their own vantage point. If desired, however, it would also be possible to permit future generations to make their own additions to such information as originated with a particular individual (or individuals). Such additional information could comprise supplemental information or could comprise a kind of annotation or footnote to the already existing information. In such a case the aforementioned step of obtaining 101 information could further comprise receiving such additional information from an eligible source and incorporating that additional information into the information itself. By one approach, however, the original information can remain in an inviolate form, thereby always rendering it available along with whatever additional content may have been added over the years.

By such an approach the information as provided by an original organization can be supplemented, explained, or otherwise expanded upon by future generations of the organization's agents. This, in turn, can provide a powerful mechanism by which such information can comprise a living, breathing collection of information rather than eventually losing relevance and becoming an anachronism rather than an aid.

If desired, one or more of these steps can be conditioned upon the offering of consideration from one or more of the participating parties. For example, by one approach, all of the described steps might be accommodated by a single upfront payment that effectively serves to endow the legacy of the provided information. In the alternative, piecemeal payments can be offered at various stages of the process as desired. Accordingly, an initial fee can be assessed to facilitate obtaining the information with yet another fee incrementally assessed, if desired, to place that information into some appropriate form (to facilitate its storage, its eventual dissemination to a successor agent, and so forth). In such a case, additional fees might be due and payable, perhaps from time to time, to support the aforementioned storage of that information and/or the provision of that information to a given successor agent. Numerous other possibilities are of course available in this regard as well.

These teachings provide an easily scaled and highly leveragable construct whereby knowledge of various kinds can become a proprietary driver over time for corresponding organizations. These teachings provide a way by which wisdom and hard-earned insights can be passed to one's successors within an organization in a private and confidential manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in this regard, if desired, such a process can be optionally modified to permit receiving permission to render public at least a portion of the aforementioned information and to then facilitate at least a limited publication of such information. As another example in this regard, the information for a given organization, which information has been extended, added to, and/or otherwise annotated over the years can be organized in various ways to facilitate searching by, for example, a particular author, contributor, or subject, a particular generation, century, decade, or year, and/or topic or result. This could include, for example, an appropriately configured and populated database, an index, and so forth. This might also include, if desired, a layer-based approach that permits a viewer to selectively remove subsequent contributions on a given basis (such as with respect to a particular time frame, or contributor, or the like).

I claim:

1. A method comprising:
   obtaining information from a plurality of individuals via an interview process conducted with at least one of the individuals wherein at least some of the individuals are agents for different organizations;
   identifying for each of the plurality of individuals information recipient criteria as a function of their organization-based successor lineage with respect to a corresponding one of the plurality of individuals by identifying information recipient criteria to be applied when determining whether to deny providing the information to one of the organization-based successors as corresponds to a given corresponding respective organization-based predecessor, wherein the information recipient criteria to be applied when determining whether to deny providing the information comprises at least one of:
   an amount of time that the organization-based successor has served as a organization-based successor to the organization-based predecessor;
   a change of ownership with respect to the organization served by the organization-based predecessor;
   a change of control with respect to the organization served by the organization-based predecessor;
   a change with respect to a particular product offering of the organization served by the organization-based predecessor;
   a change with respect to a particular service offering of the organization served by the organization-based predecessor;
   a change with respect to market share performance of the organization served by the organization-based predecessor;
   non-volatily storing the information under conditions designed to preserve the informational integrity of the information for multiple successive organization-based successor generations;
   maintaining the information in confidence while storing the information;
   providing the information as corresponds to a given one of the plurality of individuals to respective organization-based successors of the given one who meet the information recipient criteria as automatically determined by a computer;
   such that successive generations of the organization-based successors have sequential access to the information as corresponds to their respective organization-based predecessor while the information remains unrevealed to others.

2. The method of claim 1 wherein obtaining the information via an interview process conducted with at least one of the individuals further comprises conducting a live interview.

3. The method of claim 1 wherein obtaining the information via an interview process conducted with at least one of the individuals further comprises conducting an interview with the at least one of the individuals using a virtual interviewer, wherein the virtual interviewer comprises, at least in part, an interactive software-based interviewer.

4. The method of claim 3 wherein the interactive software-based interviewer comprises an artificial intelligence-based platform.

5. The method of claim 3 wherein the virtual interviewer further comprises, at least in part, a hard-copy-based interview format.

6. The method of claim 1 wherein obtaining information from a plurality of individuals comprises substantively organizing the information for at least one of the plurality of individuals.

7. The method of claim 6 wherein substantively organizing the information comprises organizing the information by topic areas.

8. The method of claim 1 wherein obtaining information from a plurality of individuals comprises obtaining at least one of:
   textually-based content;
   audio-only content;
   audio-visual content;
   visual-only content;
   olfactory-based content.

9. The method of claim 8 wherein obtaining information from a plurality of individuals comprises obtaining the information using at least one of:
   a questionnaire;
   a visual recording media;
   an audio recording media;
   chemical analysis.

10. The method of claim 1 wherein obtaining information from a plurality of individuals comprises obtaining the information for each of the individuals via a single corresponding information-gathering event.

11. The method of claim 10 wherein the single information-gathering event comprises a plurality of temporally discrete sub-events.

12. The method of claim 1 wherein obtaining information from a plurality of individuals comprises adding information to already received information for a given one of the plurality of individuals.

13. The method of claim 12 wherein adding information to already received information for a given one of the plurality of individuals further comprises adding the information using a diary-style information entry look-and-feel form factor.

14. The method of claim 1 wherein identifying for each of the plurality of individuals information recipient criteria as a function of their organization-based successor lineage with respect a corresponding one of the plurality of individuals comprises identifying at least one specific organization-based hierarchical function.

15. The method of claim 14 further comprising:
   identifying for at least one of the plurality of individuals a predetermined process to determine a degree of similarity between a organization-based hierarchical function as is served by a organization-based successor of the at least one of the plurality of individuals to the one specific organization-based hierarchical function.

16. The method of claim 15 wherein the predetermined process comprises, at least in part:
   a process to facilitate selecting at least one party to determine the degree of similarity.

17. The method of claim 1 wherein identifying for each of the plurality of individuals information recipient criteria as a function of their organization-based successor lineage with respect a corresponding one of the plurality of individuals comprises identifying at least one specific organization-based responsibility.

18. The method of claim 1 further comprising:
   obtaining from at least one of the plurality of individuals at least one additional criterion to be met by a given one of the organization-based successors before providing the information as corresponds to the at least one of the plurality of individuals to the given one of the organization-based successors.

19. The method of claim 18 wherein the at least one additional criterion comprises a criterion as regards:
   an age of the given one of the organization-based successors;
   an educational attainment of the given one of the organization-based successors;
   an academic achievement of the given one of the organization-based successors;
   a organization-based achievement of the given one of the organization-based successors;
   matrimonial status of the given one of the organization-based successors;
   health of the given one of the organization-based successors;
   illegal behavior by the given one of the organization-based successors;
   substance abuse by the given one of the organization-based successors;
   a lie detector test of the given one of the organization-based successors;
   an addiction of the given one of the organization-based successors;
   gender of the given one of the organization-based successors;
   a demonstrative level of maturity of the given one of the organization-based successors;
   net worth of the given one of the organization-based successors;
   an occurrence of a particular specified event.

20. The method of claim 1 wherein non-volatily storing the information under conditions designed to preserve the informational integrity of the information for multiple successive organization-based successor generations comprises at least one of:
   storing the information using electromagnetic data storage facilities;
   storing the information using optical data storage facilities;
   storing the information using scrivened content on a non-volatile medium.

21. The method of claim 1 wherein non-volatily storing the information under conditions designed to preserve the informational integrity of the information for multiple successive organization-based successor generations comprises storing the information using redundant storage facilities.

22. The method of claim 21 wherein the redundant storage facilities are located substantially geographically distal to one another.

23. The method of claim 21 wherein at least one of the redundant storage facilities is co-resident with an emergency shelter that is designed to provide relatively long term survival opportunities for at least one person with respect to civilly-catastrophic events.

24. The method of claim 1 wherein non-volatily storing the information under conditions designed to preserve the informational integrity of the information for multiple successive organization-based successor generations comprises physically storing the information in a location that is substantially exempt from regulation by a single sovereignty.

25. The method of claim 24 wherein the location comprises a platform that is at least one of:
   submerged;
   floating;
   above water;
   airborne;
   space borne.

26. The method of claim 24 wherein non-volatily storing the information under conditions designed to preserve the informational integrity of the information for multiple successive organization-based successor generations comprises storing the information in a micronation.

27. The method of claim 1 wherein non-volatily storing the information under conditions designed to preserve the informational integrity of the information for multiple successive organization-based successor generations comprises:
   determining that a storage practice is now available that is better than a presently used storage practice that is being used to non-volatily store the information;
   using the storage practice that is now available to non-volatily store the information.

28. The method of claim 27 wherein determining that a storage practice is now available comprises repeatedly assessing presently available storage practices.

29. The method of claim 1 wherein providing the information as corresponds to a given one of the plurality of individuals to respective organization-based successors of the given one who meet the information recipient criteria comprises providing the information in a substantially original form.

30. The method of claim 1 wherein providing the information as corresponds to a given one of the plurality of individuals to respective organization-based successors of the given one who meet the information recipient criteria comprises providing the information in a substantially modified form.

31. The method of claim 1 wherein providing the information as corresponds to a given one of the plurality of individuals to respective organization-based successors of the given one who meet the information recipient criteria comprises using the information to form a curriculum and delivering the curriculum to the respective organization-based successors.

32. The method of claim 31 wherein delivering the curriculum comprises delivering the curriculum using a virtual academic setting.

33. The method of claim 1 further comprising:
   receiving organization-based assets as corresponds to one of the different organizations;
   holding the assets in trust;
   providing at least a portion of the assets to a organization-based successor of a corresponding organization-based predecessor in conjunction with providing the information as corresponds to a given one of the plurality of individuals to their respective organization-based successor.

34. The method of claim 33 further comprising:
   assessing performance of the respective organization-based successor with respect to at least some portion of the information as is given to the respective organization-based successor;
   providing at least a further portion of the assets to the respective organization-based successor as a function, at least in part, of the performance.

35. The method of claim 1 further comprising:
   receiving additional information from a given one of the respective organization-based successors;
   incorporating the additional information into the information as was stored for provision to the given one of the respective organization-based successors.

36. The method of claim 1 further comprising:
   tracking the organization-based successors to provide status information;
   using the status information to facilitate providing the information as corresponds to a given one of the plurality of individuals to respective organization-based successors of the given one who meet the information recipient criteria.

37. The method of claim 1 further comprising:
   receiving permission to render public at least a portion of the information as corresponds to a given one of the plurality of individuals;
   facilitating at least a limited publication of the at least a portion of the information.

38. The method of claim 37 further comprising:
   receiving consideration in return for publishing the at least a portion of the information.

39. The method of claim 1 wherein:
   obtaining information from a plurality of individuals further comprises receiving, for at least one such item of information, a corresponding trigger criterion; and
   non-volatily storing the information further comprises modifying the at least one such item of information in response to an occurrence of the trigger criterion.

40. The method of claim 39 wherein the trigger criterion comprises at least one of:
   a particular date;
   a particular specific event;
   a particular kind of event.

41. The method of claim 39 wherein receiving, for at least one such item of information, a corresponding trigger criterion comprises receiving, for the at least one such item of information, a plurality of corresponding trigger criteria.

42. The method of claim 39 wherein modifying comprises deleting.

43. The method of claim 1 further comprising:
   receiving at least some consideration upon non-volatily storing the information.

44. A method comprising:
   obtaining information from a plurality of different organizations;
   identifying for the information of each of the plurality of different organizations information recipient criteria to be applied when determining whether to deny providing the information to a candidate successor organization-based agent as a function, at least in part, of at least one specific organization-based hierarchical function, wherein the information recipient criteria to be applied when determining whether to deny providing the information comprises at least one of:
   an amount of time that the successor organization-based agent has served in a particular role on behalf of a corresponding one of the different organizations;
   an amount of time that the successor organization-based agent has served at at least a particular hierarchical level within a corresponding one of the different organizations;

a change of ownership with respect to a corresponding one of the different organizations;

a change of control with respect to a corresponding one of the different organizations;

a change with respect to a particular product offering of a corresponding one of the different organizations;

a change with respect to a particular service offering of a corresponding one of the different organizations;

a change with respect to market share performance of a corresponding one of the different organizations;

non-volatily storing the information and the information recipient criteria under conditions designed to preserve the informational integrity of the information and the information recipient criteria for multiple successive successor organization-based agent generations;

maintaining at least the information in confidence while storing the information;

providing the information as corresponds to a given one of the different organizations to respective successor organization-based agents of the given one who meet the information recipient criteria as automatically determined by a computer;

such that successive generations of the successor organization-based agents within each of the different organizations have sequential access to the information as corresponds to their respective organization while the information remains unrevealed to others.

45. The method of claim 44 wherein obtaining information from a plurality of different organizations comprises, at least in part, obtaining information from a plurality of individuals that are agents for a given one of the different organizations.

46. The method of claim 45 wherein identifying for the information of each of the plurality of different organizations information recipient criteria as a function, at least in part, of at least one specific organization-based hierarchical function comprises, at least in part, identifying a organization-based hierarchical function that corresponds to a organization-based hierarchical function as is served by at least one of the plurality of individuals.

47. The method of claim 44 wherein obtaining information from a plurality of different organizations comprises obtaining the information via an interview process conducted with at least one agent of at least one of the different organizations.

48. The method of claim 44 wherein obtaining the information via an interview process conducted with at least one agent of at least one of the different organizations further comprises conducting an interview using a virtual interviewer.

49. The method of claim 48 wherein the virtual interviewer comprises, at least in part, an interactive software-based interviewer.

50. The method of claim 49 wherein the interactive software-based interviewer comprises an artificial intelligence-based platform.

51. The method of claim 44 wherein obtaining information from a plurality of different organizations comprises substantively organizing the information for at least one of the different organizations.

52. The method of claim 51 wherein substantively organizing the information comprises organizing the information by at least one of:
topic area;
hierarchical functional responsibility;
titular responsibility;
chronology.

53. The method of claim 44 wherein obtaining information from a plurality of different organizations comprises obtaining at least one of:
textually-based content;
audio-only content;
audio-visual content;
visual-only content;
olfactory-based content.

54. The method of claim 53 wherein obtaining information from a plurality of different organizations comprises obtaining the information using at least one of:
a questionnaire;
a visual recording media;
an audio recording media;
chemical analysis.

55. The method of claim 44 wherein obtaining information from a plurality of different organizations comprises obtaining the information for each given one of the different organizations via a single corresponding information-gathering event.

56. The method of claim 55 wherein the single information-gathering event comprises a plurality of temporally discrete sub-events.

57. The method of claim 44 wherein obtaining information from a plurality of different organizations comprises adding additional information to already received information for a given one of the different organizations.

58. The method of claim 57 wherein adding additional information to already received information for a given one of the different organizations further comprises receiving the additional information from one of the respective successor organization-based agents who met the information recipient criteria and received the information as corresponds to the given one of the different organizations.

59. The method of claim 44 wherein identifying for each of the plurality of different organizations information recipient criteria as a function, at least in part, of at least one specific organization-based hierarchical function comprises identifying the at least one specific organization-based hierarchical function.

60. The method of claim 59 further comprising:
identifying for at least one of the plurality of different organizations a predetermined process to determine a degree of similarity between:
a organization-based hierarchical function as is served by a candidate successor organization-based agent; and
the at least one specific organization-based hierarchical function;
to thereby determine whether to provide the information to the candidate successor organization-based agent.

61. The method of claim 60 wherein the predetermined process comprises, at least in part:
a process to facilitate selecting at least one party to determine the degree of similarity.

62. The method of claim 44 wherein identifying for each of the plurality of different organizations information recipient criteria as a function, at least in part, of at least one specific organization-based hierarchical function comprises identifying at least one specific organization-based responsibility.

63. The method of claim 44 further comprising:
obtaining from at least one of the plurality of different organizations at least one additional criterion to be met by a given one of the successor organization-based agents before providing the information as corresponds to a given one of the different organizations to the given one of the successor organization-based agents.

64. The method of claim 63 wherein the at least one additional criterion comprises a criterion as regards:
an age of the given one of the successor organization-based agents;
an educational attainment of the given one of the successor organization-based agents;
an academic achievement of the given one of the successor organization-based agents;
a organization-based achievement of the given one of the successor organization-based agents;
matrimonial status of the given one of the successor organization-based agents;
health of the given one of the successor organization-based agents;
illegal behavior by the given one of the successor organization-based agents;
substance abuse by the given one of the organization-based successors;
a lie detector test of the given one of the organization-based successors;
an addiction of the given one of the successor organization-based agents;
gender of the given one of the successor organization-based agents;
a demonstrative level of maturity of the given one of the successor organization-based agents;
net worth of the given one of the successor organization-based agents;
an occurrence of a particular specified event.

65. The method of claim 44 wherein non-volatily storing the information under conditions designed to preserve the informational integrity of the information for multiple successive successor organization-based agent generations comprises at least one of:
storing the information using electromagnetic data storage facilities;
storing the information using optical data storage facilities;
storing the information using scrivened content on a non-volatile medium.

66. The method of claim 44 wherein non-volatily storing the information under conditions designed to preserve the informational integrity of the information for multiple successive successor organization-based agent generations comprises storing the information using redundant storage facilities.

67. The method of claim 66 wherein the redundant storage facilities are located substantially geographically distal to one another.

68. The method of claim 66 wherein at least one of the redundant storage facilities is co-resident with an emergency shelter that is designed to provide relatively long term survival opportunities for at least one person with respect to civilly-catastrophic events.

69. The method of claim 44 wherein non-volatily storing the information under conditions designed to preserve the informational integrity of the information for multiple successive successor organization-based agent generations comprises physically storing the information in a location that is substantially exempt from regulation by a single sovereignty.

70. The method of claim 69 wherein the location comprises a substantially stationary platform in international waters.

71. The method of claim 69 wherein non-volatily storing the information under conditions designed to preserve the informational integrity of the information for multiple successive successor organization-based agent generations comprises storing the information in a micronation.

72. The method of claim 44 wherein non-volatily storing the information under conditions designed to preserve the informational integrity of the information for multiple successive successor organization-based agent generations comprises:
determining that a storage practice is now available that is better than a presently used storage practice that is being used to non-volatily store the information;
using the storage practice that is now available to non-volatily store the information.

73. The method of claim 72 wherein determining that a storage practice is now available comprises repeatedly assessing presently available storage practices.

74. The method of claim 44 wherein providing the information as corresponds to a given one of the different organizations to respective successor organization-based agents of the given one who meet the information recipient criteria comprises providing the information in a substantially original form.

75. The method of claim 44 wherein providing the information as corresponds to a given one of the different organizations to respective successor organization-based agents of the given one who meet the information recipient criteria comprises providing the information in a substantially modified form.

76. The method of claim 44 wherein providing the information as corresponds to a given one of the different organizations to respective successor organization-based agents of the given one who meet the information recipient criteria comprises using the information to form a curriculum and delivering the curriculum to the respective successor organization-based agents.

77. The method of claim 76 wherein delivering the curriculum comprises delivering the curriculum using a virtual academic setting.

78. The method of claim 44 further comprising:
receiving organization-based assets as corresponds to one of the different organizations;
holding the assets in trust;
providing at least a portion of the assets to the respective successor organization-based agent of the one of the different organizations in conjunction with providing the information as corresponds to the one of the different organizations to the respective successor organization-based agent.

79. The method of claim 78 further comprising:
assessing performance of the respective successor organization-based agent with respect to at least some portion of the information as is given to the respective successor organization-based agent;
providing at least a further portion of the assets to the respective successor organization-based agent as a function, at least in part, of the performance.

80. The method of claim 44 further comprising:

providing a predetermined information destruction criterion as corresponds to at least one of the different organizations;

upon detecting that the predetermined information destruction criterion has been meet, destroying the information that was provided by the at least one of the different organizations that corresponds to the predetermined information destruction criterion.

81. The method of claim 44 further comprising:

providing a process to permit changes to the information recipient criteria as corresponds to at least a given one of the different organizations.

82. The method of claim 81 wherein providing a process to permit changes to the information recipient criteria as corresponds to at least a given one of the different organizations comprises, at least in part, providing a process to permit changes to the information recipient criteria as corresponds to at least a given one of the different organizations by a successor organization-based agent who met the information recipient criteria.

83. The method of claim 44 wherein obtaining information from a plurality of different organizations further comprises, for at least one of the plurality of different organizations, obtaining information from a third party on behalf of the at least one of the plurality of different organizations.

\* \* \* \* \*